(12) United States Patent
Piri et al.

(10) Patent No.: US 12,335,255 B1
(45) Date of Patent: Jun. 17, 2025

(54) SYSTEMS AND METHODS FOR SECURE USER AUTHENTICATION WITH PASSKEYS ON SHARED COMPUTING DEVICES

(71) Applicant: IDMELON TECHNOLOGIES INC., Vancouver (CA)

(72) Inventors: Bahram Piri, Vancouver (CA); Hassan Seifi, Vancouver (CA)

(73) Assignee: IDMELON TECHNOLOGIES INC., Vancouver (CA)

( * ) Notice: Subject to any disclaimer, the term of this patent is extended or adjusted under 35 U.S.C. 154(b) by 0 days.

(21) Appl. No.: 18/946,325

(22) Filed: Nov. 13, 2024

Related U.S. Application Data

(63) Continuation-in-part of application No. 18/910,161, filed on Oct. 9, 2024.

(51) Int. Cl.
*H04L 9/40* (2022.01)

(52) U.S. Cl.
CPC .................. *H04L 63/083* (2013.01)

(58) Field of Classification Search
CPC ..................................................... H04L 63/083
(Continued)

(56) References Cited

U.S. PATENT DOCUMENTS

| | | | |
|---|---|---|---|
| 9,887,983 | B2 | 2/2018 | Lindemann et al. |
| 10,911,428 | B1 * | 2/2021 | Roth ..................... H04L 9/3213 |

(Continued)

OTHER PUBLICATIONS

Moving forward passwordless authentication: challenges and implementations for the private cloud, Gordin et al, Nov. 2021. (Year: 2021).*

(Continued)

*Primary Examiner* — Jahangir Kabir
(74) *Attorney, Agent, or Firm* — Norton Rose Fulbright Canada LLP; Maya Medeiros

(57) ABSTRACT

Embodiments described herein provide systems and methods for secure and efficient user authentication across a variety of computing devices, such as desktops, laptops, smartphones, and tablets across operating systems such as Windows, MacOS, IOS, Android, and iPadOS. The system incorporates an authenticator application configured to communicate with internal or external user identifier scanners, such as RFID/NFC readers, fingerprint scanners, facial recognition cameras, and QR/Barcode scanners, using transport protocols like USB, BLE, or NFC. The authenticator application serves as a third-party passkey provider by interfacing with platform WebAuthn APIs, enabling WebAuthn-based authentication for native applications, browsers, and services, or alternatively as a browser extension, intercepting WebAuthn API calls directly within a browser environment. An authentication server, accessible over a network, verifies user identities by mapping unique identifiers to stored authenticators and requesting additional authentication factors as needed, such as a security PIN. Upon successful authentication, the server transmits passkeys and a session token to the authenticator application, enabling it to handle further authentication requests locally. The system supports advanced session management for shared device environments, allowing configurable passkey storage with options for one-time, time-based, or shift-based expiration, automatically clearing passkeys upon session completion. This design delivers a versatile, secure, and seamless authentication experience across diverse user environments.

20 Claims, 7 Drawing Sheets

(58) Field of Classification Search
USPC .............................................................. 726/6
See application file for complete search history.

(56) References Cited

U.S. PATENT DOCUMENTS

| | | | |
|---|---|---|---|
| 11,159,511 B1* | 10/2021 | Geusz | .................... H04L 63/102 |
| 11,824,850 B2* | 11/2023 | Walters | .................. H04L 63/083 |
| 2008/0046983 A1* | 2/2008 | Lester | ...................... H04L 63/08 |
| | | | 726/5 |
| 2013/0124855 A1* | 5/2013 | Varadarajan | ............. G07F 19/20 |
| | | | 726/4 |
| 2018/0075231 A1* | 3/2018 | Subramanian | ....... H04L 63/0807 |
| 2019/0073470 A1 | 3/2019 | Shirakawa | |
| 2020/0092272 A1* | 3/2020 | Eisen | ................... H04L 63/0869 |
| 2021/0357483 A1 | 11/2021 | Sharma et al. | |
| 2022/0239660 A1 | 7/2022 | Shimamoto | |
| 2023/0179589 A1 | 6/2023 | Kopack | |
| 2024/0113886 A1 | 4/2024 | Bhandarkar | |

OTHER PUBLICATIONS

Guo et al., Extending Registration and Authentication Processes of FI DO External Authenticator with QR Codes, Jan. 29, 2021, IEEE, pp. 518-529. (Year: 2021).

Luke et al., Using Secret Sharing to Improve FIDO Attack Resistance for Multi-Device Credentials, May 21, 2023, IEEE, pp. 49-56 (Year: 2023).

* cited by examiner

SYSTEMS AND METHODS FOR SECURE USER AUTHENTICATION WITH PASSKEYS ON SHARED COMPUTING DEVICES

CROSS REFERENCE TO RELATED APPLICATION

The application is a continuation-in-part of U.S. patent application Ser. No. 18/910,161 entitled SYSTEMS AND METHODS FOR USER AUTHENTICATION ON SHARED MOBILE DEVICES filed Oct. 9, 2024, and claims the benefit of and priority thereto, and the contents of which is hereby incorporated by reference.

FIELD

Embodiments described herein generally relate to system and methods for secure user authentication on shared computing devices using passkeys and user identifiers. More specifically, embodiments described herein apply to multi-user environments, providing seamless and secure access to various devices, including desktops, laptops, tablets, and smartphones, operating on various platforms and operating systems. Embodiments described herein further address methods for managing user passkeys through an authenticator application integrated to support authentication in compliance with standards or protocols such as, for example, Fast Identity Online 2 (FIDO2), Web Authentication (WebAuthn), and so on.

INTRODUCTION

In shared computing environments, such as workplaces, educational institutions, and healthcare facilities, securely managing user access remains a critical challenge. With multiple users accessing the same device, ensuring personalized, secure authentication without relying on dedicated hardware for each user is essential. Traditional authentication systems like password-based systems often lack the flexibility to accommodate shared device scenarios, where each environment may have different access requirements and security levels.

Standards and protocols such as Fast Identity Online (FIDO) provide users passwordless authentication using security keys (e.g., smartphone or hardware security key in the term of authenticator). Users interact with online resources (e.g., web browsers or applications as relying party) that utilize the WebAuthn API to register and authenticate themselves using FIDO Client to Authenticator Program (CTAP) with an authenticator. The authenticator can register a user with a given relying party and later assert possession of the registered credential, also known as WebAuthn passkey, and optionally verify the user, when requested by the relying party.

Systems may rely on external hardware authenticators to secure access, which can be costly, impractical, and difficult to manage at scale in shared environments. This dependency on hardware-based solutions creates logistical challenges, as each user requires a separate device or key to authenticate. Furthermore, external hardware adds complexity to device management, increasing the burden on administrators responsible for system upkeep and security.

There is a need for a system that leverages users' existing identifiers—such as RFID/NFC cards, fingerprints, or QR codes—as keys to access hosted authenticators in shared environments. Embodiments described herein can provide an improved system for shared environments. For example, such a system could eliminate the reliance on external hardware, reducing operational costs and simplifying user access without sacrificing security. By allowing users to authenticate with familiar identifiers, the system can enhance usability and ensures seamless integration into existing security practices.

In addition to removing the hardware dependency, there is a need for a solution that empowers administrators to manage and control authentication processes more effectively. Software-powered authenticators offer a flexible, scalable approach, allowing administrators to configure security settings, manage access controls, and implement session-based restrictions tailored to shared devices. This flexibility is particularly valuable in multi-user environments where authentication requirements vary across different user groups.

Embodiments described herein can provide a system that hosts authenticators centrally, accessible through network infrastructure, enables user passkey management while maintaining security and convenience. By leveraging software-powered authenticators, administrators can dynamically adjust security settings, configure passkey expiration, and provide time-based or shift-based session management without needing physical hardware for each user.

Therefore, there is a strong need for a versatile, software-based authentication system that securely integrates with users' existing identifiers, providing streamlined, hardware-free access across shared devices. Embodiments described herein can provide an improved system for security and versatility. Such a system would enhance both user experience and administrative control, delivering a more practical solution for managing access in shared environments.

Embodiments described herein can provide an improved system that allows users to authenticate with existing identifiers and eliminates the dependency on external authenticators. By hosting authenticators and managing passkeys through a centralized server, embodiments described herein can ensure secure, flexible access for multiple users, enabling administrators to optimize security and usability on shared computing devices.

SUMMARY

Embodiments described herein relate to a system and methods that utilize passkeys and user identifiers to securely authenticate users on shared computing devices in accordance with W3C Web Authentication (WebAuthn) standards. The invention provides a multi-platform-compatible solution for environments requiring high security and multi-user access, such as workplaces, educational institutions, and other shared spaces. This invention aims to reduce the vulnerabilities associated with traditional password-based systems while enhancing the convenience and security of passkey-based authentication in shared device settings.

Shared computing devices equipped with the system described herein are configured to securely authenticate users through an authenticator application that manages passkey-based authentication processes. The authenticator application interacts with an authentication server and various user identifier scanners, which may be integrated within or externally connected to the computing device. The system's adaptability across devices running operating systems such as Windows, MacOS, IOS, Android, and iPadOS makes it suitable for a wide range of multi-user environments.

In some embodiments, the authenticator application installed on a shared computing device operates as a third-party passkey provider by interfacing with the platform's WebAuthn API, thereby enabling seamless integration with native applications, browsers, and other services on the device. The authenticator application adapts to different operating systems by leveraging platform APIs, allowing it to integrate with WebAuthn authentication protocols on Windows, MacOS, ChromeOS, IOS, Android, and iPadOS. This integration enables the authenticator application to function as a cohesive, cross-platform solution for user authentication that supports WebAuthn authentication requests and provide passkey-based authentication for various relying parties.

The authenticator application, as a third-party passkey provider, works in conjunction with the platform WebAuthn API, enabling passkeys to be accessible for secure WebAuthn-based authentication requests across native applications, browsers, and other relying parties on the device. This integration ensures that the authenticator application can support authentication requests initiated by both platform-native services and web applications, providing a seamless, unified experience.

In some embodiments, the authenticator application may also be implemented as a browser extension or plugin in certain embodiments, allowing it to intercept WebAuthn API calls directly within the browser. This configuration bypasses the platform's native WebAuthn interface, enabling the authenticator application to manage authentication requests independently within a web-based environment. This functionality is particularly useful in scenarios where user access is mediated through web applications, providing enhanced flexibility and control over the authentication process.

The authenticator application facilitates secure access by communicating with various user identifier scanners to obtain user-specific identifiers. These scanners may be integrated into the device or connected externally via transport protocols such as USB, Bluetooth Low Energy (BLE), or NFC. The flexibility in scanner connectivity enables the authenticator application to operate across diverse hardware configurations.

In some embodiments, the authenticator application may locally store passkeys temporarily, using time-limited access permissions. The passkeys are cleared at the end of the session, allowing the system to support multi-user, shared device scenarios without compromising security.

In some embodiments, the authenticator application works with native applications on the device, accessing passkeys through the WebAuthn API to perform authentication as a third-party provider. This integration supports a broad range of services on the device, enabling a cohesive experience for native, browser, and application-based WebAuthn requests.

In some embodiments, when the authenticator application receives a WebAuthn authentication request from a relying party, whether a native application, browser, or web service, it uses the user's passkeys either stored locally or fetched from the authentication server. The application can then generate a WebAuthn authentication response on behalf of the user, streamlining access across multiple services.

User identifier scanners supported by the system may include, but are not limited to, RFID/NFC readers, fingerprint scanners, facial recognition cameras, and QR/Barcode scanners. These scanners capture unique identifiers from users, allowing for secure, individualized authentication on shared computing devices. The diversity of identifier types enables the system to accommodate different security requirements, user preferences, and hardware environments.

In some embodiments, the system includes an authentication server that centrally manages user-specific authenticators and securely stores user passkeys. The authentication server can perform user verification by mapping received user identifiers to stored authenticators. Based on the identifier type, the server may apply various matching operations to ensure accurate and secure verification of the user's identity.

The authentication server is a central component of the system, securely managing the mapping between user identifiers and stored authenticators. It applies appropriate matching operations based on the user identifier type, such as facial recognition, to ensure accurate and secure identity verification. The authentication server also includes features for secure transmission of authentication requests and responses with the authenticator application. This communication is secured by encryption protocols, ensuring that user data is protected throughout the authentication process.

In some embodiments, the authentication server is further configured to request additional authentication factors, such as a security key PIN, based on the system configuration and the identifier type provided. This multi-factor approach enhances security, particularly in shared device environments where additional verification may be required to prevent unauthorized access. For example, if a user is authenticating with an RFID/NFC card, the server may request a PIN in addition to the identifier, providing an added layer of security.

Upon successful user verification, the authentication server generates an authentication response, including a session token and user passkeys. This response is transmitted to the authenticator application, enabling the device to handle subsequent WebAuthn authentication requests using the retrieved passkeys. The session token allows for secure, continuous communication between the authenticator application and authentication server throughout the session.

The session token also serves as a way to streamline user verification for subsequent authentication requests during the same session. Rather than re-verifying the user identifier each time, the authenticator application can use the session token to validate the user's identity for ongoing WebAuthn requests, reducing friction while maintaining security.

The post-user verification mechanism enables the authenticator application to manage passkey-based authentication requests locally on the device, without requiring repeated interactions with the authentication server. This feature can be configurable, allowing the authenticator application to handle WebAuthn requests locally based on the retrieved passkeys or forward them to the authentication server for remote processing if desired.

In shared device environments, the system can be configured with a session management mechanism that automatically clears or resets user-specific data, including passkeys, upon session termination. This feature supports configurable options such as single-use, time-based, or shift-based expiration, ensuring that passkeys and other sensitive information are securely removed from the device after each user session.

Embodiments described herein include support for shared computing devices that can be used by multiple users without compromising security or usability. The system's configurable session management options make it ideal for environments where devices are shared among users, allowing each user to securely access their applications and services using passkeys without leaving residual data.

The system can operate across multiple platforms, including desktops, laptops, tablets, and mobile devices, providing a consistent authentication experience regardless of the operating system. This compatibility extends to major operating systems such as Windows, MacOS, ChromeOS, IOS, Android, and iPadOS, allowing the authenticator application to function seamlessly on diverse hardware. This multi-platform compatibility allows for easy deployment in diverse computing environments with varied hardware.

In some embodiments, the system allows for real-time passkey retrieval from the authentication server if passkeys are not already available on the device. When a user initiates authentication, the authenticator application checks if the required passkeys are locally stored. If they are not available, the application fetches them from the authentication server, ensuring uninterrupted access.

The passkey retrieval process is securely managed by the authentication server, which applies necessary encryption and protection measures, such as hardware security modules (HSM), to safeguard stored passkeys and user data. This secure storage and retrieval process prevents unauthorized access to sensitive information on the shared computing device. This setup is ideal for environments where shared device access is granted for sensitive tasks, such as healthcare or financial applications.

Embodiments described herein support a wide range of user identifier types, such as RFID/NFC, biometric data, and QR codes, which allows for flexible user authentication in environments with diverse security requirements. For example, an office setting might rely on badge-based RFID cards for access, while another facility might prioritize biometric identifiers for added security.

Each user identifier type is mapped to a unique user authenticator, enabling the system to reliably distinguish between users and maintain separate authentication profiles on shared devices. This mapping process ensures that only the authenticated user can access the stored passkeys, enhancing security on shared computing devices.

Embodiments described herein allow for a highly configurable user experience, enabling the administrator to set preferences for session duration, multi-factor authentication, and passkey expiration based on specific security needs. This configurability makes the system suitable for environments with varying security requirements.

Embodiments described herein provide a comprehensive and flexible authentication solution for shared computing devices, enhancing security through passkey-based authentication and advanced session management features. Embodiments described herein use a unique combination of multi-platform support, third-party passkey provider integration, session management, and support for diverse user identifiers which establishes a new standard in secure, shared device authentication. Embodiments described herein address the challenges of securing shared computing devices by implementing robust authentication processes that are flexible, configurable, and resistant to unauthorized access.

Embodiments described herein provide a system for secure user authentication with passkeys on shared computing devices. The system includes an authenticator application residing on a computing device, which is configured to: communicate with various user identifier scanners, which may be internal or external to the computing device, to obtain user-specific identifiers; communicate with an authentication server to verify the user's identity based on the user identifier obtained from the scanner; operate as a third-party passkey provider integrated with the platform WebAuthn API to provide passkey-based authentication; function as a browser extension or plugin to intercept WebAuthn API calls for web-based relying parties and provide passkey-based authentication; and transmit authentication requests and unique identifiers securely to the authentication server, enabling centralized authentication management and verification. The system includes a user identifier scanner configured to capture user-specific identifiers, which may be internal to the device or externally connected through USB, BLE, or NFC, and capable of capturing various types of identifiers such as RFID/NFC data, biometric data, and QR codes to initiate the authentication process. The system includes an authentication server accessible over a network, configured to: host user-specific authenticators and securely store user passkeys; map received user identifiers to stored authenticators and perform user verification using various matching operations based on the identifier type; request an additional authentication factor, such as a security PIN, when required based on the identifier type and configuration; generate and transmit an authentication response, including user passkeys and an authentication token, upon successful user verification, enabling the authenticator application to handle further WebAuthn authentication requests either locally or by forwarding them back to the authentication server for processing; and store passkeys securely using secure storage options such as a hardware security module (HSM) to protect sensitive user data. The system includes a post-user verification mechanism, where upon successful user verification: the authenticator application receives user passkeys and a session token, enabling it to act as a platform authenticator on the computing device, making passkeys available for WebAuthn-based authentication across native applications, browsers, and services on the device; the authenticator application temporarily stores the user passkeys for the duration of the session, with configurable options for single-use, time-based, or session-based expiration; the authenticator application processes WebAuthn authentication requests locally or forwards them to the authentication server based on configuration, and transmits the WebAuthn authentication response to the relying party, granting the user access to the requested service or application; and wherein the system operates across multiple platforms, including but not limited to Windows, MacOS, IOS, Android, and iPadOS, allowing the authenticator application to perform secure, passkey-based authentication on various devices.

In some embodiments, the authenticator application is configured to communicate with various user identifier scanners, both internal and external to the computing device, through transport protocols including USB, BLE, and NFC, enabling it to obtain user-specific identifiers such as RFID/NFC data, biometric data, and QR codes.

In some embodiments, the authenticator application communicates with the authentication server over a secure network connection to verify the user's identity. The authentication server applies different matching algorithms based on the type of user identifier provided, and depending on the configuration, may require an additional authentication factor, such as a security PIN, for enhanced security.

In some embodiments, the authenticator application is configured to operate as a third-party passkey provider by integrating with the platform WebAuthn API through a passkey provider interface, thereby enabling native applications, browsers, and other relying parties on the computing device to securely access passkeys for WebAuthn-based authentication.

In some embodiments, the authenticator application functions as a browser extension or plugin within a browser environment, intercepting WebAuthn API calls initiated by a relying party web application. This configuration enables the authenticator application to manage WebAuthn requests independently of the platform's native WebAuthn interface, allowing it to generate and return authentication responses directly to the relying party within the browser.

In some embodiments, the authenticator application transmits authentication requests and user-specific identifiers securely to the authentication server, allowing the server to centrally manage and verify authentication information.

In some embodiments, the user identifier scanner is configured to capture unique identifiers, including but not limited to RFID/NFC card data, fingerprints, facial recognition data, and QR codes, allowing it to gather user-specific identifiers across various configurations.

In some embodiments, the user identifier scanner may be internal to the computing device or an external device connected through USB, BLE, or NFC, providing flexibility in hardware configurations for obtaining user identifiers.

In some embodiments, the user identifier scanner communicates the captured user identifier information to the authenticator application for initiating the authentication process and ensuring secure access control for user-specific authentication.

In some embodiments, the authentication server is configured to manage user-specific authenticators and securely store user passkeys, providing a centralized source for accessing user-specific authentication credentials.

In some embodiments, the authentication server verifies the user's identity by mapping received user identifiers to stored authenticators and applying various matching operations based on the identifier type, ensuring accurate user verification.

In some embodiments, the authentication server is configured to request an additional authentication factor, such as a security PIN, based on the identifier type or system configuration, enhancing the security of the user verification process.

In some embodiments, the authentication server generates an authentication response upon successful user verification, including a session token and user passkeys, enabling the authenticator application to handle WebAuthn requests locally or forward them to the authentication server for further processing.

In some embodiments, the authentication server securely stores passkeys and other sensitive user information in a secure storage facility, such as a hardware security module (HSM), to protect against unauthorized access.

In some embodiments, upon successful user verification, the authenticator application receives user passkeys and a session token, allowing it to act as a platform authenticator on the computing device and make passkeys accessible for WebAuthn-based authentication across native applications, browsers, and services.

In some embodiments, the authenticator application temporarily stores user passkeys for the duration of the user session, with options for single-use, time-based, or session-based expiration, ensuring secure access in shared environments.

In some embodiments, the authenticator application, based on configuration, processes WebAuthn authentication requests either locally on the device using the retrieved passkeys or by forwarding them to the authentication server for remote processing.

In some embodiments, the authenticator application transmits WebAuthn authentication responses to relying parties, enabling WebAuthn-based authentication for applications, browsers, and native services on the device.

In some embodiments, the authenticator application, by managing session tokens and passkeys, ensures that user-specific authentication data is securely accessible for the duration of a session and can be erased or reset upon session expiration.

In some embodiments, the authenticator application is configured to manage user sessions in shared device environments by automatically clearing or resetting user-specific passkeys and authentication data based on configurable conditions, such as session expiration, a specified time interval, or at the end of a work shift, thereby ensuring that the device is ready for the next user.

Many further features and combinations thereof concerning embodiments described herein will appear to those skilled in the art following a reading of the instant disclosure.

DESCRIPTION OF THE FIGURES

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale, and components within the figures may be depicted not to scale with each other.

Systems, devices, aspects, methods, and results are described in greater detail herein with reference to the following figures in which.

DETAILED DESCRIPTION

Example embodiments of systems and methods are now described in detail with reference to the figures.

Figure 1:
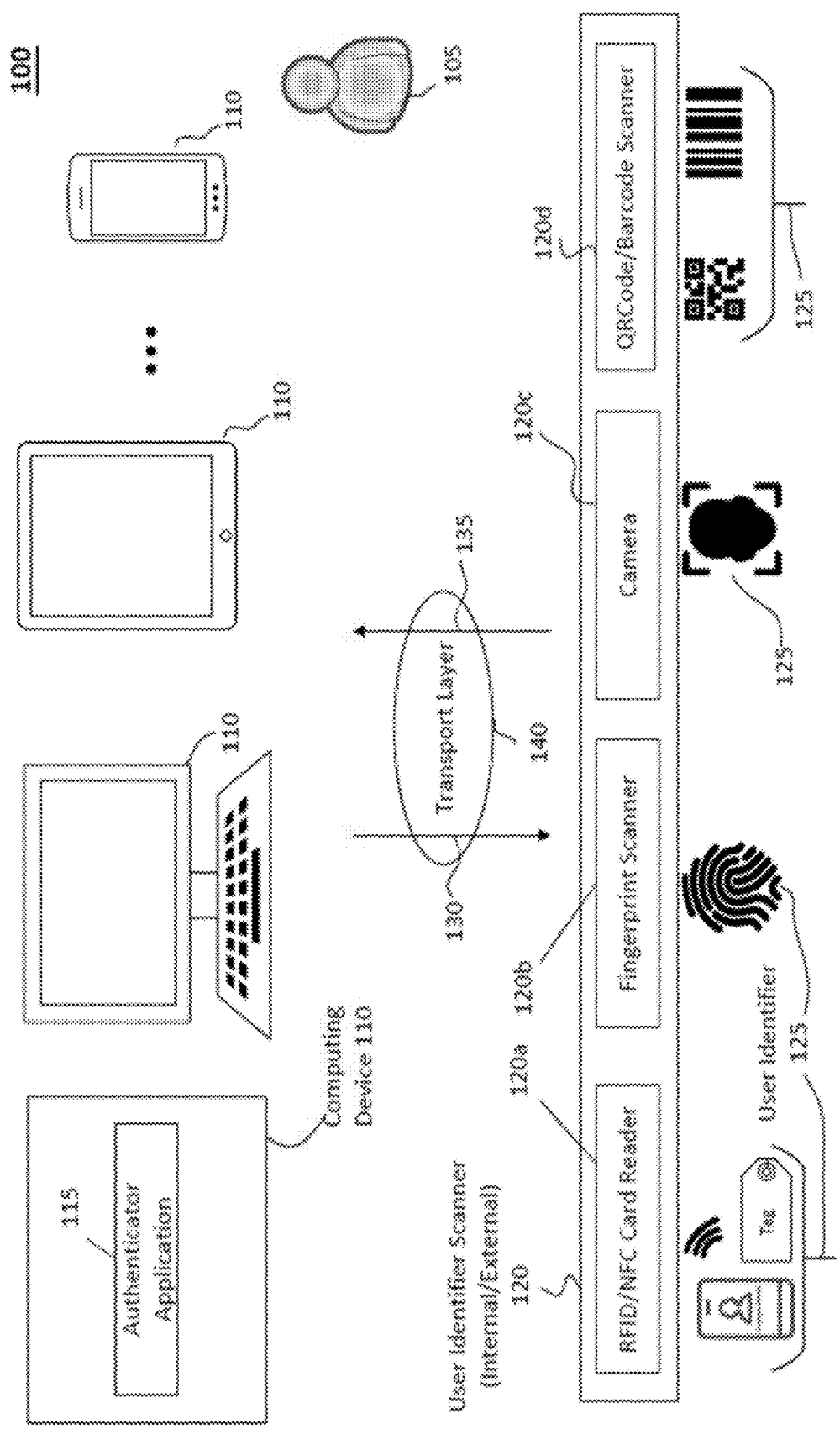
FIG. 1 shows an example high-level system architecture diagram for an authenticator application residing on various computing devices (such as desktops, laptops, and mobile devices) and its interaction with both internal and external user identifier scanners, according to some embodiments described herein.

In FIG. 1, there is shown a high-level architecture for an example system 100 illustrating how various user identifier scanners 120 can communicate with an authenticator application 115 to provide a user identifier 125. This user identifier 125 is utilized by the authenticator application 115 for authentication purposes, particularly in shared computing environments where multiple users 105 may access the same device 110. The functionality shown here forms part of a broader authentication system 200, which is further detailed in FIG. 2A.

In FIG. 1, system 100 illustrates a system-architecture diagram where in a user 105 is engaging with various computing devices 110, including but not limited to personal computers (PCs), laptops, desktop computers, MacBooks, iPads, iPhones, Android phones, tablets, and smartphones. These computing devices 110 operate on a range of operating systems, such as Windows, MacOS, ChromeOS, Android, IOS, iPadOS, and Linux-based systems. Each device 110 is configured with an authenticator application 115 that facilitates secure user authentication across different platforms.

As shown in FIG. 1, system 100 contains an authenticator application 115 within computing device 110 that leverages various user identifiers 125, which may include RFID/NFC cards, badges, key fobs, tags, fingerprint data, facial recognition data, QR codes, and barcodes. These identifiers are captured by corresponding user identifier scanners 120, including RFID/NFC scanners 120a, fingerprint scanners 120b, cameras 120c, and QR code/barcode scanners 120d. The scanners may either be built directly into the device (internal) or connected externally through methods such as USB, Bluetooth Low Energy (BLE), or NFC.

Communication between the authenticator application 115 and the user identifier scanners 120 occurs over transport layers 140 provided by the operating system or scanner vendors. This includes both outbound communication 130 from the authenticator to the scanner and inbound communication 135 from the scanner to the authenticator. This interaction enables the application 115 to retrieve and process the user identifier 125, which is subsequently used to uniquely identify and authenticate the user within the system depicted in FIG. 2A.

FIG. 1 illustrates a high-level view of the overall architecture of an example system 100 that can be used to make a relation between authenticator application 115 with various user identifier scanner 120 to read user identifier 125 used to uniquely identify user 105 with the authentication system.

Transport layers 140 in system 100 represent the various communication protocols that facilitate data exchange between the authenticator application 115 and the user identifier scanners 120. These transport layers 140 may be provided by the operating system or developed by scanner vendors, allowing for seamless communication across a range of scanner types. The authenticator application 115 initiates outbound communication 130 to request data from the scanner 120, while inbound communication 135 allows the scanner 120 to transmit the captured user identifier 125 back to the authenticator application 115.

The user identifier scanners 120 presented in system 100 can be either integrated directly within the computing device 110 (internal) or connected externally through various interfaces. External scanners 120 may connect via USB, Bluetooth Low Energy (BLE), NFC, or other supported communication protocols, enhancing the system's flexibility in accommodating different identification methods. This setup allows the system to support a wide range of user identifiers 125 and devices 110, making it suitable for diverse environments, including shared device scenarios where multiple users may authenticate using different methods. The flexible use of transport layers 140 ensures that both internal and external scanners 120 can communicate efficiently with the authenticator application 115, regardless of the scanner's physical configuration.

The user identifier 125 is a machine-readable identifier that uniquely identifies a user within the system. It can be read by various user identifier scanners 120 and may take on multiple form factors depending on the identification method used. These form factors include RFID/NFC cards, badges, key fobs, tags, fingerprints, facial recognition data, QR codes, and barcodes. Each form factor offers a distinct way of capturing and identifying users within the system.

For instance, an RFID/NFC card, badge, or key fob can serve as a physical user identifier 125, which can be read by an RFID/NFC scanner 120a to transmit unique identification data to the authenticator application 115. Similarly, biometric data such as fingerprints or facial recognition can serve as user identifiers 125, captured by fingerprint scanners 120b or cameras 120c, respectively. QR codes and barcodes are also supported, with a QR code/barcode scanner 120d used to read and relay the encoded user information back to the authenticator application 115. These various form factors make the system adaptable to different user preferences and security requirements, providing flexibility and ease of use in shared device environments. By supporting a broad range of user identifiers 125, the system ensures that each user can be accurately and uniquely identified, regardless of the specific identifier format or the scanning method employed.

Figure 2A:
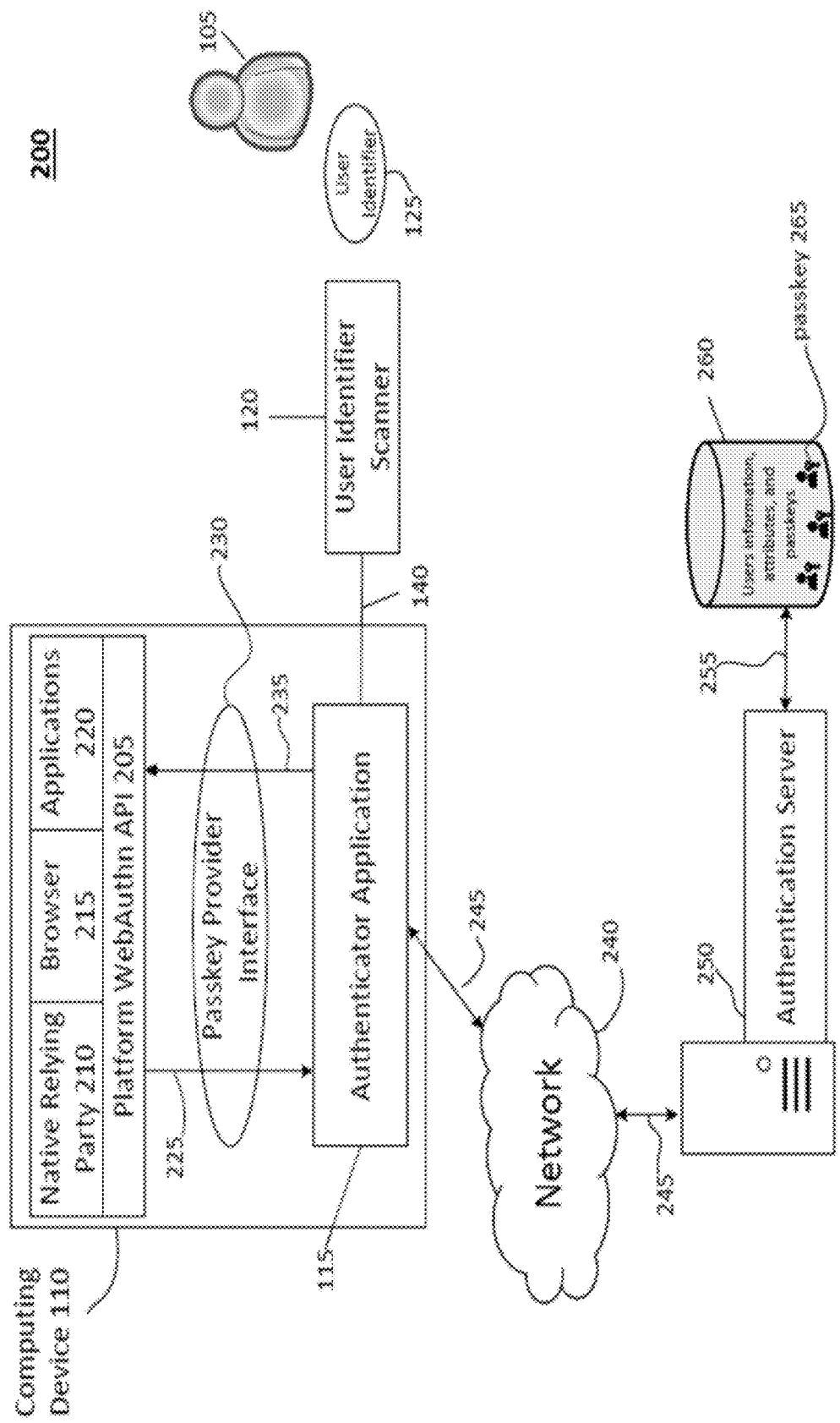
FIG. 2A shows an example system architecture diagram for an authenticator application operating as a third-party passkey provider via the platform WebAuthn API, allowing native applications, browsers, and other services to access passkeys for WebAuthn-based authentication, according to some embodiments described herein.

In FIG. 2A, system 200 illustrates a system architecture in which a user 105 presents or provides a user identifier 125 to a user identifier scanner 120. This scanner 120 communicates with the authenticator application 115 through a transport layer 140. FIG. 2A demonstrates the communication flow between the authenticator application 115, user identifier scanners 120, and the authentication server for user verification and WebAuthn-based passkey authentication 250. In this implementation, the authenticator application 115, depending on the platform (e.g., Windows, MacOS, IOS, Android, iPadOS), configures or implements the appropriate passkey provider interface 230 to function as a third-party passkey provider through the platform WebAuthn API 205. This setup enables the authenticator application 115 to provide authentication services to native relying parties 210 (such as OS login), browsers 215, or applications 220 on the device.

The authenticator application 115 plays a central role in the authentication process, as it receives the user identifier 125 from the scanner 120 and processes it to initiate a secure verification flow. Depending on the platform on which it operates—such as Windows, MacOS, IOS, Android, or iPadOS—the authenticator application 115 configures or implements the appropriate passkey provider interface 230. This passkey provider interface 230 enables the authenticator application to act as a third-party passkey provider within the system, interfacing with the platform WebAuthn API 205. This integration allows the authenticator application 115 to serve as a trusted source for passkey-based authentication, making it accessible to the platform's native applications 210, browsers 215, and other software that rely on WebAuthn-based security 220.

The WebAuthn API 205 facilitates communication between the authenticator application 115 and various relying parties, which may include native relying parties 210, browsers 215, or other applications 220 running on the computing device 110. The native relying party 210 can refer to operating system-level authentication services, such as login mechanisms that require passkey-based verification. Similarly, browsers 215 and applications 220 that support WebAuthn can interact with the authenticator application 115 through the platform WebAuthn API 205. This setup ensures that the authenticator application 115 can respond to WebAuthn authentication requests 225 from any supported relying party, regardless of whether it is a native service or a third-party application.

When the authenticator application 115 receives a WebAuthn authentication request 225 from a relying party, it initiates a verification process to authenticate the user 105 based on the user identifier 125. To verify the user 105, the authenticator application 115 establishes communication with an authentication server 250 via a network 240. This communication consists of two parts: a connection 245 from the authenticator application 115 to the network 240 and another connection 245 from the network 240 to the authentication server 250. The authentication server 250, in turn, uses the user identifier 125 to initiate a matching process that validates the identity of user 105.

The user verification process on the authentication server 250 may employ various matching operations, depending on the type of user identifier 125 presented. For example, if the user identifier 125 is an RFID/NFC card or badge, the server 250 may apply one type of matching operation, whereas a different process may be used for biometric identifiers such as fingerprints or facial data. In cases where additional security is needed, the server 250 may require the user 105 to enter a PIN. This multi-layered verification ensures that the system can securely validate the user's identity before granting access.

After successfully verifying the user 105, the authenticator application 115 proceeds to handle the authentication request 225 according to one of two possible configurations. In the first configuration, the authenticator application 115 fetches the user's passkeys 265 from the authentication server 250 and stores them temporarily on the device 110. This allows the device to process the authentication request 225 locally, improving efficiency by reducing the need for additional server interactions. This local processing option is particularly useful in scenarios where the device may be intermittently connected to the network or where reduced latency is desired.

In some embodiments, the authenticator application 115 forwards the authentication request 225 to the authentication server 250 for remote processing. In this scenario, the server 250 handles the authentication request and generates a response, which it then transmits back to the authenticator application 115. This remote processing option provides flexibility for devices that may not have sufficient resources to process authentication locally, or in cases where centralized control over authentication is desired. Upon receiving the authentication response from the server, the authenticator application 115 relays it back to the relying party.

Once the authentication is processed, either locally or remotely, the authenticator application 115 provides the WebAuthn authentication response 235 to the relying party. This response allows the relying party—whether it be a native service, browser, or application—to complete the authentication process, granting the user 105 access to the requested resource. This seamless interaction between the authenticator application 115, the authentication server 250, and the relying party ensures that the user's identity is verified securely and efficiently, regardless of the authentication method or system configuration.

In some embodiments, the authenticator application 115 may be configured to facilitate the use of computing device 110 in a shared work environment, where multiple users 105 need to authenticate individually. To accommodate such environments, the authenticator application 115 can specify a time-to-live for each user's information, including passkeys 265 and other data obtained after successful verification. This time-to-live configuration ensures that user-specific information remains on the device 110 only temporarily, supporting scenarios like one-time use, time-based schedules, or work shift schedules. The authentication server 250 is equipped with a secure storage 260, accessible through secure protocols 255, to store user information, attributes, identifiers, and passkeys 265. This storage may use hardware security modules (HSMs) or other secure storage solutions to protect sensitive data, further enhancing the security of the authentication system.

The authenticator application 115 in this system is a crucial component, providing the computing device 110 with the capability to function as a third-party passkey provider. Through its integration with the passkey provider interface 230, the authenticator application 115 enables the device to support WebAuthn authentication requests. This setup allows the authenticator application 115 to communicate securely with native relying parties 210, browsers 215, and applications 220 that rely on passkey-based authentication. By enabling this communication, the system supports a seamless user experience across various services on the device, leveraging the platform WebAuthn API 205 for interoperability with WebAuthn-compliant clients.

The network 240 serves as a foundational element in this architecture, facilitating secure data exchange between the authenticator application 115 and the authentication server 250. The network 240 can be implemented as a local area network (LAN), a wide area network (WAN), or any other type of network infrastructure that securely connects the device 110 and server 250. Connections 245 enable the authenticator application 115 to interact with the network 240 and subsequently reach the authentication server 250. These connections 245 ensure that data, including user identifiers 125 and passkeys 265, can be securely transmitted between the application 115 and server 250, maintaining the integrity and confidentiality of sensitive information.

The role of the authentication server 250 is to authenticate the user 105 by leveraging the user identifier 125. This identifier 125, provided by the user 105 through a scanner 120, initiates a verification process on the server 250. The server 250 can use various operations to match the identifier 125 with stored data, effectively determining the user's identity. For example, if the user presents a fingerprint as the identifier, the authentication server 250 may compare it against stored biometric templates. The server can handle multiple types of identifiers, applying appropriate matching operations based on the identifier type, thereby enhancing security by supporting multifactor authentication as needed.

In configurations where additional security is required, the authentication server 250 can request further verification from the user 105, such as a PIN or secondary identifier. This step adds an extra layer of security to the authentication process, ensuring that only authorized users can access sensitive information or resources on the computing device 110. The requirement for a PIN or secondary identifier may vary based on organizational policies, device settings, or user preferences, providing flexible security configurations to meet diverse needs.

The secure storage 260 on the authentication server 250 plays a vital role in protecting sensitive information, including passkeys 265 and user attributes. This storage 260 is accessible via secure protocols 255, which may include standards such as TLS or IPSec, ensuring that data remains encrypted and protected during transit and at rest. The authentication server 250 may also utilize hardware security modules (HSMs) or other secure storage solutions to further safeguard the data, providing an additional layer of security to prevent unauthorized access or tampering with stored information.

The passkeys 265 associated with each user are securely managed by the authentication server 250. Once the user 105 is verified, these passkeys 265 can either be fetched and stored on the computing device 110 for local processing or used remotely by the server 250 to fulfill the authentication request. This flexibility allows the system to support both local and remote processing scenarios, adapting to the resource constraints or specific requirements of different environments. By securely managing passkeys 265, the authentication server 250 ensures that each user 105 can be authenticated without compromising security.

The authenticator application 115 not only processes authentication requests but also manages user sessions on the computing device 110. In a shared environment, where multiple users 105 may access the same device 110, the authenticator application 115 can define session parameters, such as time limits or usage restrictions. These parameters ensure that each user's information, including passkeys 260 and identifiers 125, is only accessible during the active session, minimizing the risk of unauthorized access once the session ends. This session management functionality is particularly valuable in workplace settings where devices are frequently shared among employees.

Through the platform WebAuthn API 205, the authenticator application 115 can handle WebAuthn authentication requests from a variety of clients, including browsers 215 and applications 220. This capability allows the authenticator application 115 to act as an intermediary, receiving authentication requests, processing them locally or remotely, and providing responses to the requesting client. The platform WebAuthn API 205 ensures that these interactions adhere to WebAuthn standards, allowing for compatibility with third-party applications and enabling a seamless experience across different software environments on the device.

The relying parties 210, 215, and 220, which may include operating system services, web browsers, and applications, depend on the authenticator application 115 to facilitate secure authentication processes. By acting as a trusted passkey provider, the authenticator application 115 ensures that these relying parties receive verified authentication responses 235, allowing them to grant access to authorized users. This integration enables the authentication system to operate across multiple domains within the device, from logging into the OS to authenticating with online applications, thus creating a unified security framework for all user interactions.

The system 200 architecture illustrated in FIG. 2A is designed to be adaptable to various configurations, supporting both individual and shared device use cases. In a shared environment, such as a workplace or public terminal, the authenticator application 115 can be configured to enforce temporary access controls, removing user-specific data when the session expires. This adaptability allows the system to function effectively in both personal and shared contexts, meeting the needs of diverse user scenarios. By supporting multiple configurations and authentication methods, the system achieves a high level of flexibility and security.

Figure 2B:
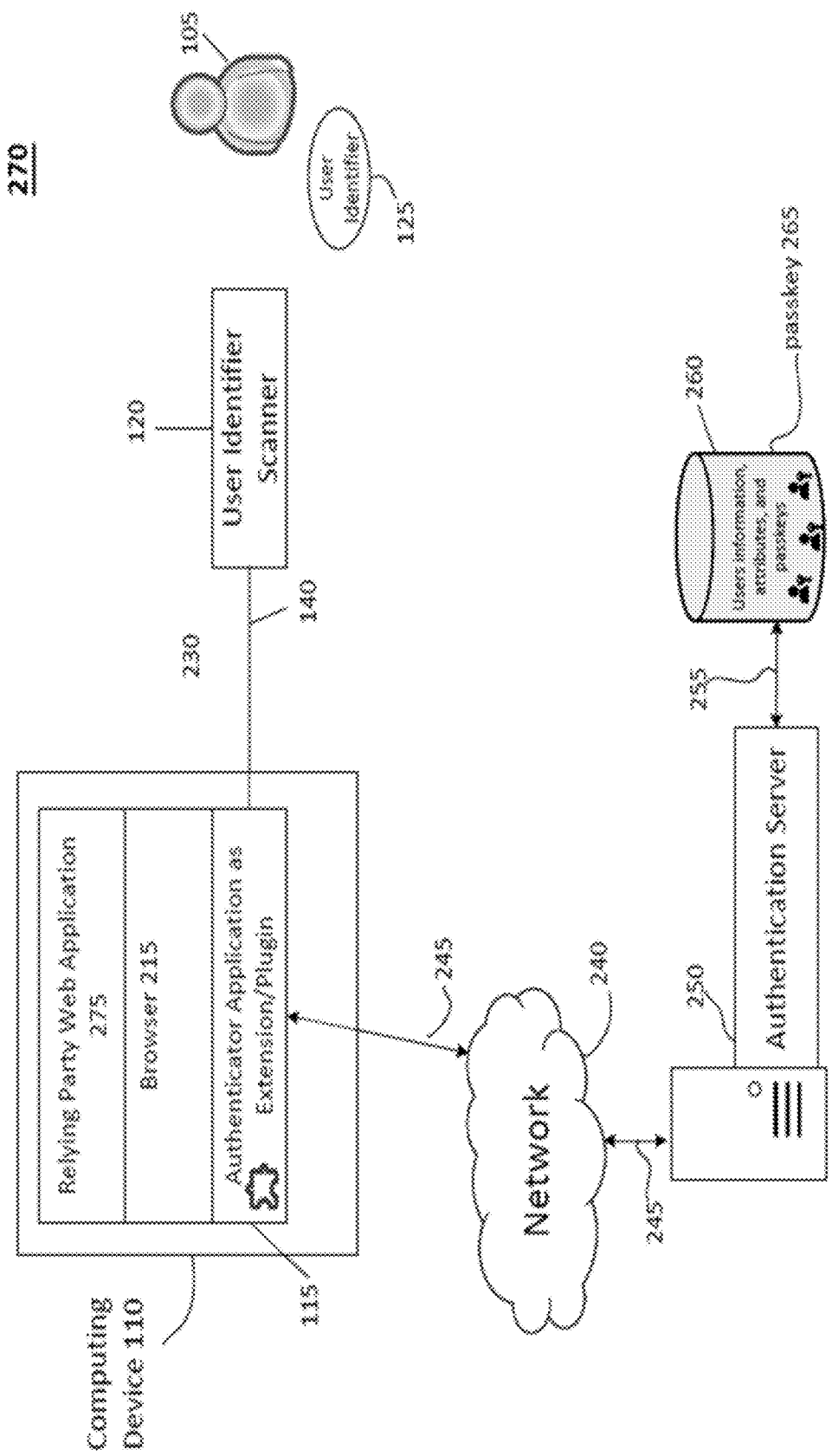
FIG. 2B shows an example system architecture diagram for an authenticator application functioning as a browser extension or plugin, intercepting WebAuthn API calls from web applications within the browser, according to some embodiments described herein.

In FIG. 2B, system 270 illustrates an alternative design or embodiment in which the authenticator application 115 is deployed as an extension or plugin within the browser 215. This setup allows the authenticator application 115 to handle WebAuthn authentication independently of the platform's native WebAuthn interface. This configuration allows the authenticator application 115 to function directly within the browser environment, enabling it to intercept WebAuthn requests that are initiated by a relying party web application 275 operating inside the browser 215. This design facilitates a seamless integration of the authenticator application 115 within the browser 215, creating an efficient and secure mechanism to handle WebAuthn authentication requests from web applications.

In system 270, the authenticator application 115, configured as a browser extension or plugin, is capable of intercepting WebAuthn requests made by the relying party web application 275. The interception process involves capturing WebAuthn authentication requests before they reach the browser's built-in WebAuthn interface or the platform's WebAuthn interface. By doing so, the authenticator application 115 assumes control over the authentication process, allowing it to manage the request and generate the necessary response independently of the browser or platform interfaces.

Once the WebAuthn request is intercepted, the authenticator application 115 proceeds to handle the request. This handling process is similar to the approach described in FIG. 2A (200), where the application 115 can process the request locally or communicate with an authentication server 250 for remote processing. The authenticator application 115 verifies the user 105 based on the provided user identifier 125, and, if necessary, may engage in a user verification process involving the authentication server 250. The authenticator application's control over the WebAuthn request allows it to tailor the authentication process according to specific system requirements and user security needs.

After handling the WebAuthn request, the authenticator application 115 provides the WebAuthn response back to the relying party web application 275. This response enables the relying party web application 275 to authenticate the user 105 and grant access to the requested resource. By operating within the browser 215, the authenticator application 115 ensures that the response is returned in a manner compatible with web applications, streamlining the authentication process for web-based services while maintaining security and interoperability.

This implementation of the authenticator application 115 as a browser extension or plugin involves technically overwriting or bypassing the standard Web Authentication API utilized by the browser or platform WebAuthn interfaces. By taking control of this API, the authenticator application 115 intercepts WebAuthn requests directly from the relying party web application 275, ensuring that the requests do not reach the default WebAuthn processing interfaces within the browser or platform. This configuration effectively redirects WebAuthn handling to the authenticator application 115, giving it full authority over the request management and response generation.

The authenticator application 115 in this design serves as an interceptor, capturing and processing WebAuthn requests from web applications 275 without relying on the browser's or platform's native WebAuthn infrastructure. This bypassing capability is particularly useful in scenarios where customized authentication workflows are required, such as when integrating third-party authentication systems or applying proprietary security protocols. By allowing the authenticator application 115 to handle requests independently, the system provides a flexible and adaptable solution for web-based authentication.

Additionally, this plugin-based approach enables the authenticator application 115 to extend its authentication capabilities across multiple web applications 275 operating within the same browser 215. By acting as a unified authentication provider, the authenticator application 115 can maintain consistent security policies and user verification methods across different web applications, creating a cohesive user experience within the browser environment. This consistency helps ensure that all web-based interactions adhere to the same authentication standards, reducing security risks associated with fragmented authentication approaches.

The use of the authenticator application 115 as a browser extension or plugin also supports modular deployment, allowing the application to be installed, updated, or removed independently of the browser's core functionality. This modularity offers significant advantages in terms of system maintenance and adaptability, enabling organizations to implement custom authentication solutions without altering the underlying browser or platform infrastructure. By providing a self-contained authentication module, the plugin-based authenticator application 115 enhances both the flexibility and security of the overall system.

In this architecture 270, the authenticator application 115 may communicate with an external authentication server 250 to verify the user 105 and retrieve passkeys 265, similar to the configurations described in system 200. The plugin or extension acts as a bridge between the web application 275 and the authentication server 250, allowing for both local and remote processing options. When configured for remote processing, the authenticator application 115 forwards the WebAuthn request to the authentication server 250, receives the authentication response, and delivers it back to the relying party web application 275. This remote verification capability ensures that the authenticator application 115 can provide robust authentication services even in complex, web-based environments.

FIG. 2B demonstrates the versatility of the authenticator application 115, highlighting its ability to function across different implementation models. By operating as a browser extension or plugin, the authenticator application 115 provides a flexible solution for WebAuthn authentication within the browser 215, effectively bypassing native WebAuthn interfaces while retaining compatibility with standard WebAuthn protocols. This design enables the authenticator application 115 to address a wide range of authentication needs, from basic web logins to advanced multi-factor authentication, making it a comprehensive tool for secure, browser-based user verification.

FIG. 5 shows an example authentication process for the example system-architecture of FIG. 2A (200) and FIG. 2B (275).

Figure 3A:
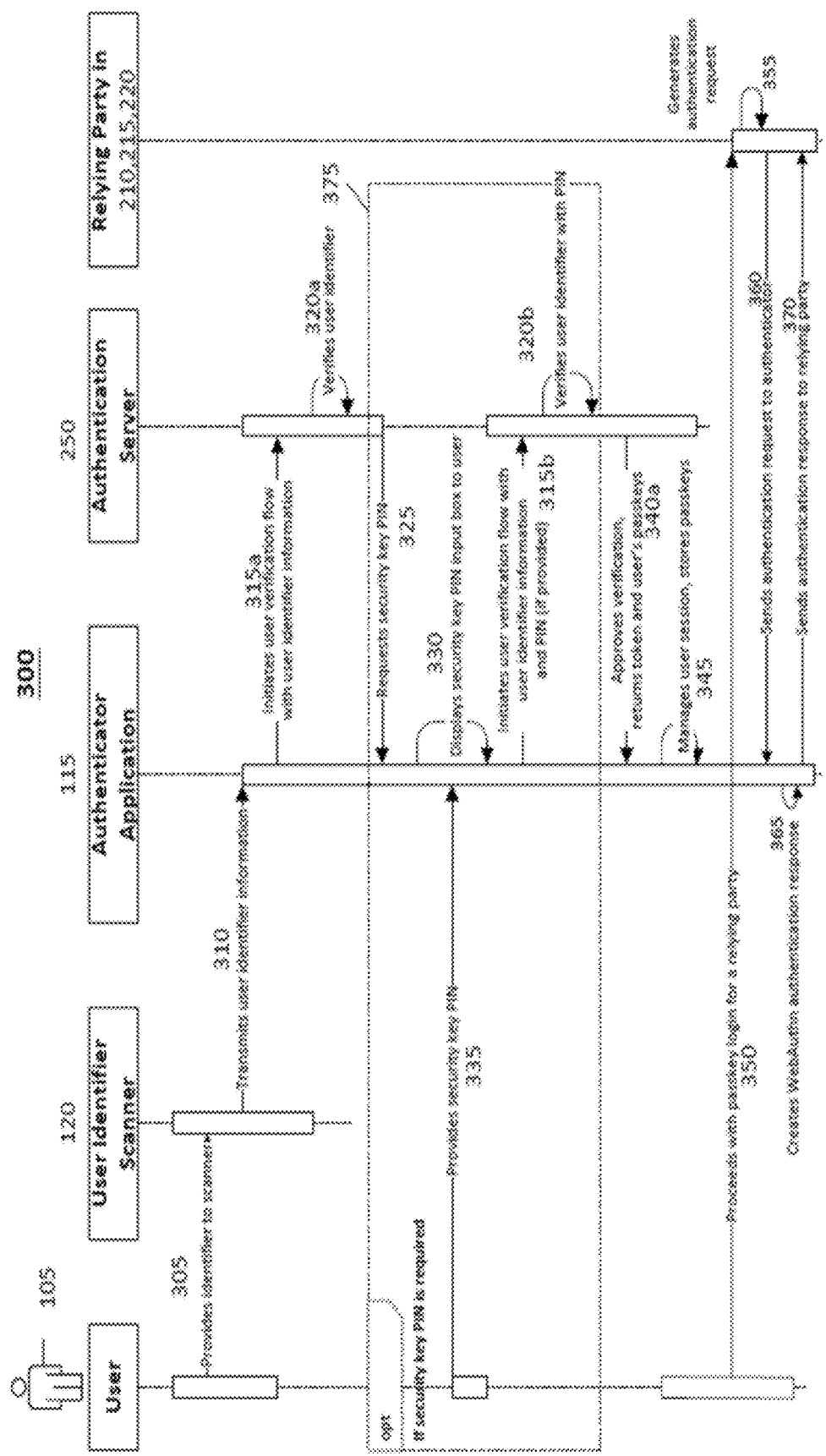
FIG. 3A shows an example flowchart diagram for user authentication where an authenticator application locally handles a WebAuthn request, using passkeys fetched from the authentication server, according to some embodiments described herein.

FIG. 3A shows an example flowchart diagram for user authentication where an authenticator application locally handles a WebAuthn request, using passkeys fetched from the authentication server, according to some embodiments described herein.

At step 305, user 105 provides the user identifier 125 to the user identifier scanner 120. At 310, the user identifier scanner 120 transmits the user identifier information 125 to the authenticator application 115. Upon receiving this information, the authenticator application 115 begins the user verification flow at 315a, using the user identifier information 125 as the primary data to authenticate the user 105. This initiation prompts a communication process between the authenticator application 115 and the authentication server 250 over a secure network 240.

The process continues at 320a, where the authentication server 250 verifies user 105 using the provided user identifier 125. Depending on the type of identifier, the authentication server 250 may leverage specific matching operations tailored to the identifier type, ensuring accurate user verification. At 325, if additional verification is deemed necessary, an optional fragment 375 begins, wherein the authentication server 250 requests a PIN to complete user verification. This request is transmitted back to the authenticator application 115, indicating that user input is required.

In response to this request, at 330, the authenticator application 115 displays a security key PIN input box to the user 105, prompting them to enter their PIN. At 335, user 105 provides the requested security key PIN, adding an additional layer of security to the authentication process. Following this, the authenticator application 115 re-initiates the user verification flow at 315b, now including both the user identifier 125 and the security PIN. This comprehensive data is then sent to the authentication server 250 for further verification.

Upon receiving the combined user identifier and PIN data at 320b, the authentication server 250 performs an enhanced verification process, applying suitable matching operations based on the provided identifier and PIN. At 340a, once the user verification is successfully completed, the authentication server 250 may issue a token to the authenticator application 115. Additionally, the server may send user passkeys 265 and other relevant user information, depending on the system configuration, enabling further secure interactions and communications.

At 345, the authenticator application 115 is configured to manage the user session and temporarily store the passkeys. In one configuration, through the passkey provider interface 230, the authenticator application 115 functions as a third-party passkey provider, making the passkeys accessible to the computing device 110. This configuration allows passkey-based authentication for various relying parties, including native relying parties 210, browsers 215, and applications 220 on the device, through the platform WebAuthn API 205. In some embodiments, the authenticator application 115 operates as a plugin or extension inside browser 215 to handle authentication requests for relying party web applications 275 residing in browser 215.

With this setup in place, at 350, user 105 can initiate a passkey login on a relying party, which could be a web application or service operating as a native relying party 210, within a browser 215, or as a separate application 220. At 355, the relying party generates a WebAuthn authentication request, signaling its need to authenticate the user through the WebAuthn protocol.

The authenticator application 115 receives this generated WebAuthn authentication request at 360. This request is routed to the authenticator application 115 either because, as depicted in system 200, the application 115 is configured as a third-party passkey provider through the platform WebAuthn API 205, or, as shown in 275, the authenticator application 115 operates as a browser plugin within browser 215, intercepting Web Authentication API calls directly. This dual compatibility ensures that the authenticator application 115 can handle WebAuthn requests from multiple sources.

Following the reception of the authentication request, at 365, the authenticator application 115 creates a WebAuthn authentication response on the device based on the passkeys fetched earlier at 340a. This response includes the necessary data to confirm user identity and satisfy the relying party's authentication requirements. Finally, at 370, the authenticator application 115 transmits the WebAuthn authentication response back to the relying party, which could be a native relying party 210, a browser 215, or an application 220, completing the authentication process.

Figure 3B:
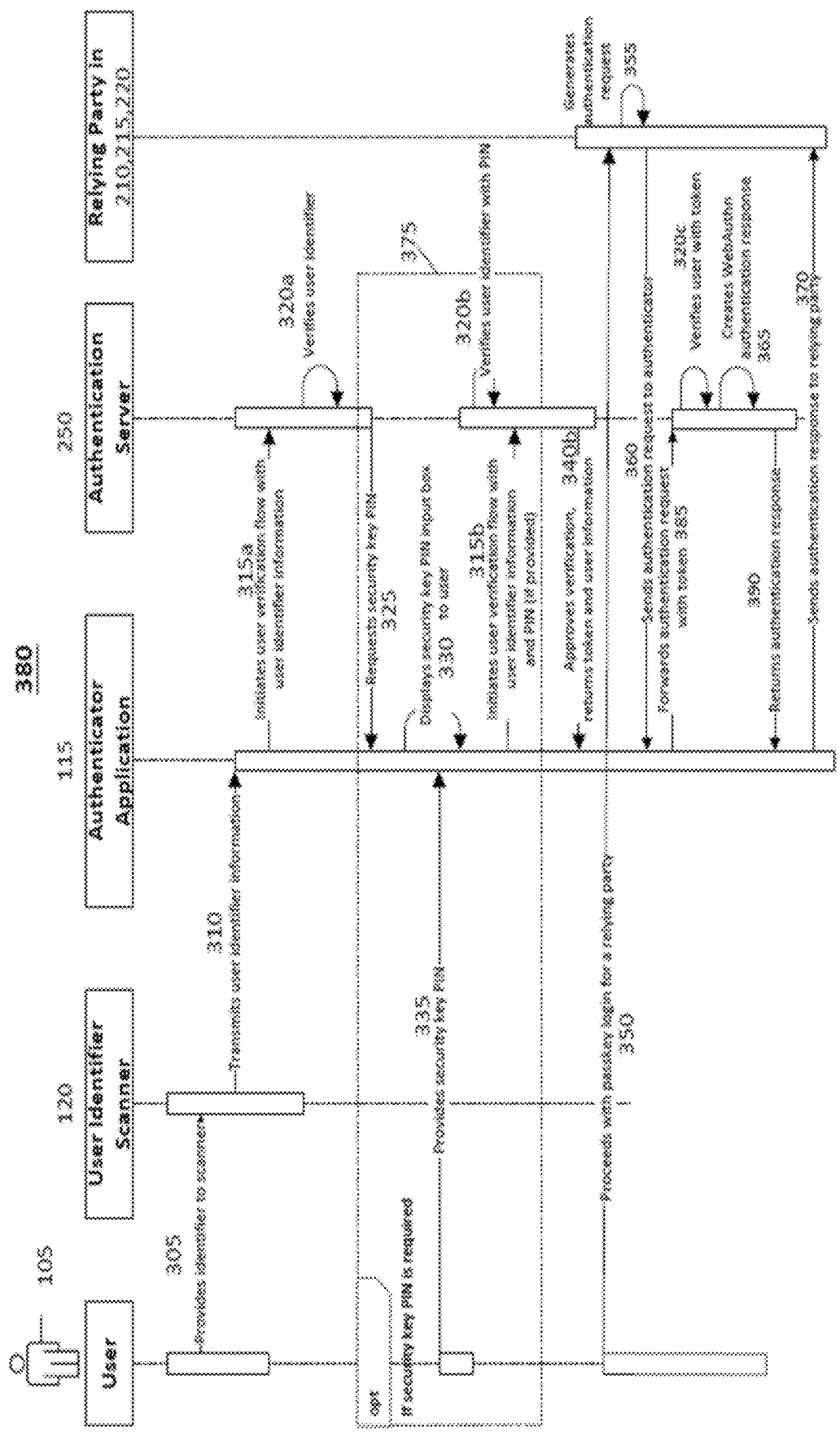
FIG. 3B shows an example flowchart diagram for user authentication where an authenticator application forwards WebAuthn requests to an authentication server for processing, which then returns the WebAuthn response to complete authentication for the relying party, according to some embodiments described herein.

FIG. 3B (380) illustrates a similar authentication process to that described in FIG. 3A (300), where the authenticator application 115 facilitates authentication for user 105 using the system architecture explained in systems 200 and 270. In this embodiment, however, the authenticator application 115 is configured to forward authentication requests to the authentication server 250 for processing, rather than handling them locally. Steps 305 through 315b in process 380 are the same as those outlined in process 300, covering the initial interactions between user 105, the user identifier scanner 120, the authenticator application 115, and the authentication server 250.

Specifically, in steps 305 to 315b, user 105 provides the user identifier 125 to the user identifier scanner 120, which then transmits this information to the authenticator application 115. The authenticator application 115 initiates a user verification flow using the identifier 125, which is subsequently sent to the authentication server 250 via network 240 for verification. In some embodiments, the server may require an additional PIN for verification, which is processed in the same manner as in process 300. Upon successful verification of the user 105, the authentication server 250 completes the initial user authentication process. However, at this point, a variation is introduced to support remote processing.

At step 340b, instead of only receiving user passkeys 265, the authenticator application 115 is issued a standard authentication token along with other user information by the authentication server 250. This token serves as an alternative to the user identifier 125, allowing it to act as a reusable credential for subsequent interactions. Rather than requiring the user identifier and PIN for each new request, the authenticator application 115 can use this token to validate the user's identity in future authentication requests. This token-based approach enables a more streamlined and efficient process for repeated authentication, particularly useful for shared or multi-user devices where re-verification is frequently needed.

Following the initial authentication process, a WebAuthn authentication request, generated by a relying party in 210, 215, or 220, is received by the authenticator application 115 at step 360. Instead of processing the request locally, as in process 300, the authenticator application 115 forwards the WebAuthn authentication request to the authentication server 250 at step 385. The authentication request is sent along with the previously issued token, enabling the authentication server 250 to validate the request based on this token without needing the original user identifier or PIN.

At step 320c, the authentication server 250 validates the user 105 by verifying the token's authenticity. This validation ensures that the request originates from an authenticated session associated with user 105, allowing the server 250 to securely process the WebAuthn request without re-authenticating the user 105 through the initial identifier and PIN. This token-based validation reduces redundancy, enabling efficient remote processing while preserving security.

Upon successful validation of the token, the authentication server 250 generates a WebAuthn authentication response at step 365. This response includes the necessary data to satisfy the relying party's authentication requirements, confirming the verified identity of user 105. The server prepares this response securely, ensuring that it meets WebAuthn standards for compatibility with the relying party's needs.

At step 390, the authentication server 250 transmits the WebAuthn authentication response back to the authenticator application 115. The authenticator application 115 receives this response, which is now ready to be relayed to the relying party as the final step in the authentication process.

Finally, at step 370, the authenticator application 115 forwards the WebAuthn authentication response to the relying party, which could be a native application 210, a browser 215, or another web application 220. By delivering this response, the authenticator application completes the authentication process, confirming the user's identity to the relying party and granting access to user 105 as needed.

This variation, where the authentication server processes WebAuthn requests remotely using a token-based system, offers a flexible and secure solution for scenarios where centralized control over authentication is preferred, or where devices may have limited resources for local processing.

Figure 4A:
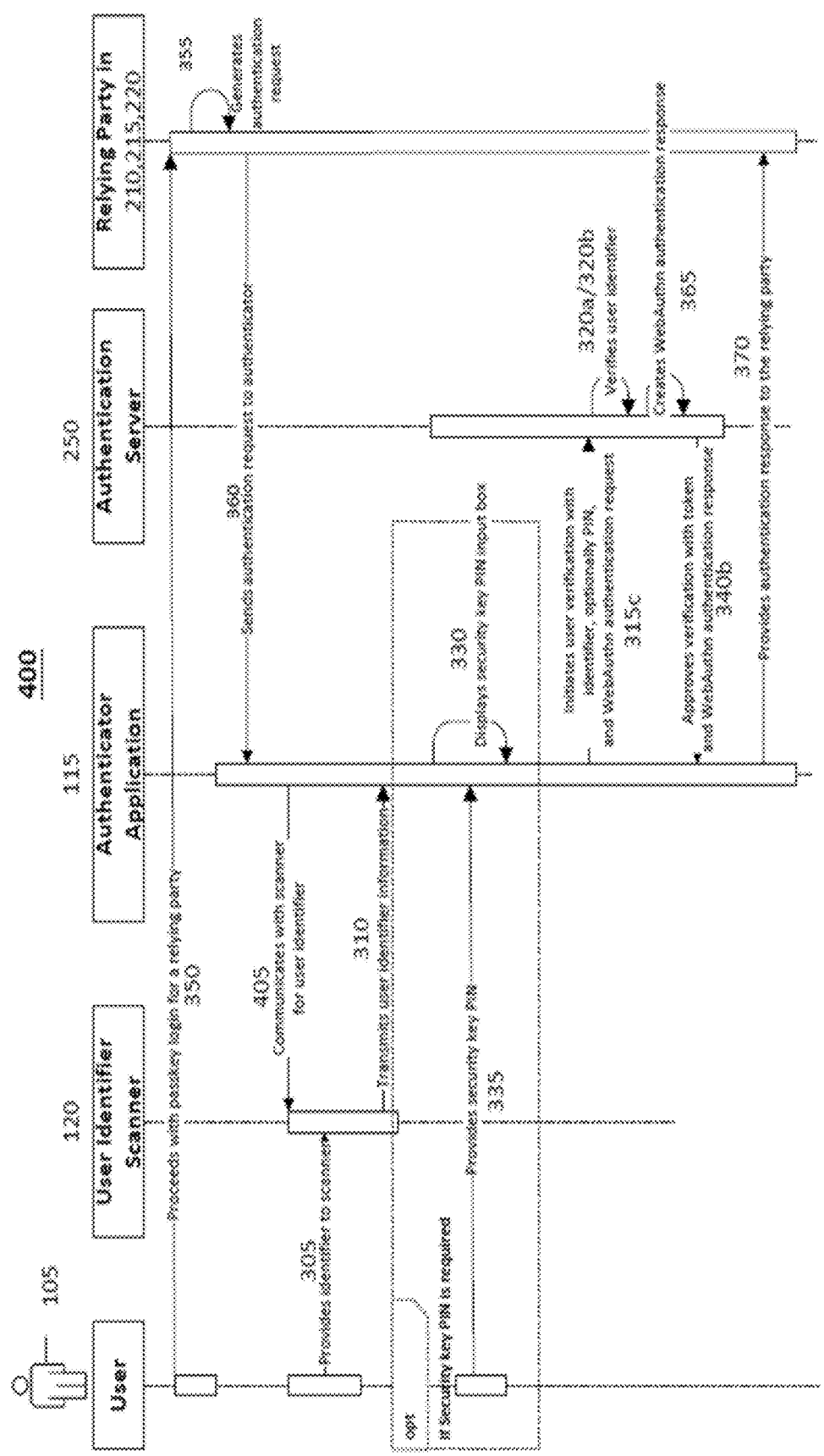
FIG. 4A shows an example authentication process diagram for a passkey login process initiated by a user on a relying party where an authenticator application communicates with an authentication server to handle a WebAuthn authentication request remotely on the server, allowing secure authentication in multi-user, shared environments, according to some embodiments described herein.

FIG. 4A illustrates an exemplary authentication process in which user 105 initiates a passkey login to access a relying party, which could be represented by a native service, browser, or web application in components 210, 215, or 220. This process demonstrates how the authenticator application 115 forwards a WebAuthn authentication request by incorporating user identifier verification and optional PIN entry for server-based validation and processing.

The process begins at step 350, where user 105 initiates the passkey login on a relying party. This relying party, which may be a service or web application, requests authentication to verify the user's identity before granting access. At step 355, the relying party in components 210, 215, or 220 generates a WebAuthn authentication request. This request is sent to the authenticator application 115 to initiate the WebAuthn-based authentication workflow.

At step 360, the authenticator application 115 receives the WebAuthn authentication request generated by the relying party at 355. The application 115 receives this request either through the platform WebAuthn API 205, if configured as a third-party passkey provider with passkey provider interface 230 as in FIG. 2A, system 200, or through interception within the browser 215 if operating as a plugin or extension as shown in FIG. 2B, system 275. This flexibility allows the authenticator application 115 to manage WebAuthn authentication requests across different deployment scenarios.

Following the receipt of the WebAuthn authentication request, the authenticator application 115 communicates with the user identifier scanner 120 at step 405 to retrieve the user identifier 125. This communication enables the authenticator application 115 to identify and authenticate user 105 using the relevant user identifier 125. The authenticator application 115 coordinates with the scanner 120 to access the necessary information for user verification.

At step 305, user 105 provides the user identifier 125 to the user identifier scanner 120. This identifier 125, which may be in the form of an RFID/NFC card, fingerprint, or QR code, allows the system to recognize the user and prepare for further authentication steps. Once the identifier is captured, at step 310, the user identifier scanner 120 transmits the user identifier information 125 to the authenticator application 115 for processing.

Based on the system configuration, the authenticator application 115 may display a security key PIN input box to user 105 at step 330. This step is optional and is determined by the configuration and security requirements of the system. At step 335, user 105 may provide the security key PIN as an additional layer of authentication if prompted by the system. This multi-factor approach enhances security by verifying the user through both the identifier and PIN.

At step 315c, the authenticator application 115 initiates a user verification flow that includes the user identifier information 125, the optionally provided PIN, and the WebAuthn authentication request received at step 360. This combined data is sent to the authentication server 250 for further validation, enabling a thorough verification of the user's identity.

Once the authentication server 250 receives the data, at step 320a/320b, it verifies user 105 using the user identifier information 125. The server 250 applies various matching operations based on the type of identifier provided, ensuring accurate user identification. If configured, the verification may include additional factors, such as the PIN, to complete the authentication process. This multi-layered approach to verification ensures secure authentication that can adapt to different configurations and security policies.

At step 365, upon successful verification of user 105, the authentication server 250 creates a WebAuthn authentication response corresponding to the WebAuthn authentication request received at step 315c. This response serves as the authentication server's confirmation of user's identity, providing the required data to authenticate the user 105 for the relying party.

Finally, at step 370, the authenticator application 115 transmits the WebAuthn authentication response to the relying party in components 210, 215, or 220. This response completes the authentication process, allowing the relying party to verify user 105's identity and grant the requested access. This process exemplifies how the system can flexibly manage WebAuthn-based authentication requests, leveraging both local and remote processing options as needed.

Figure 4B:
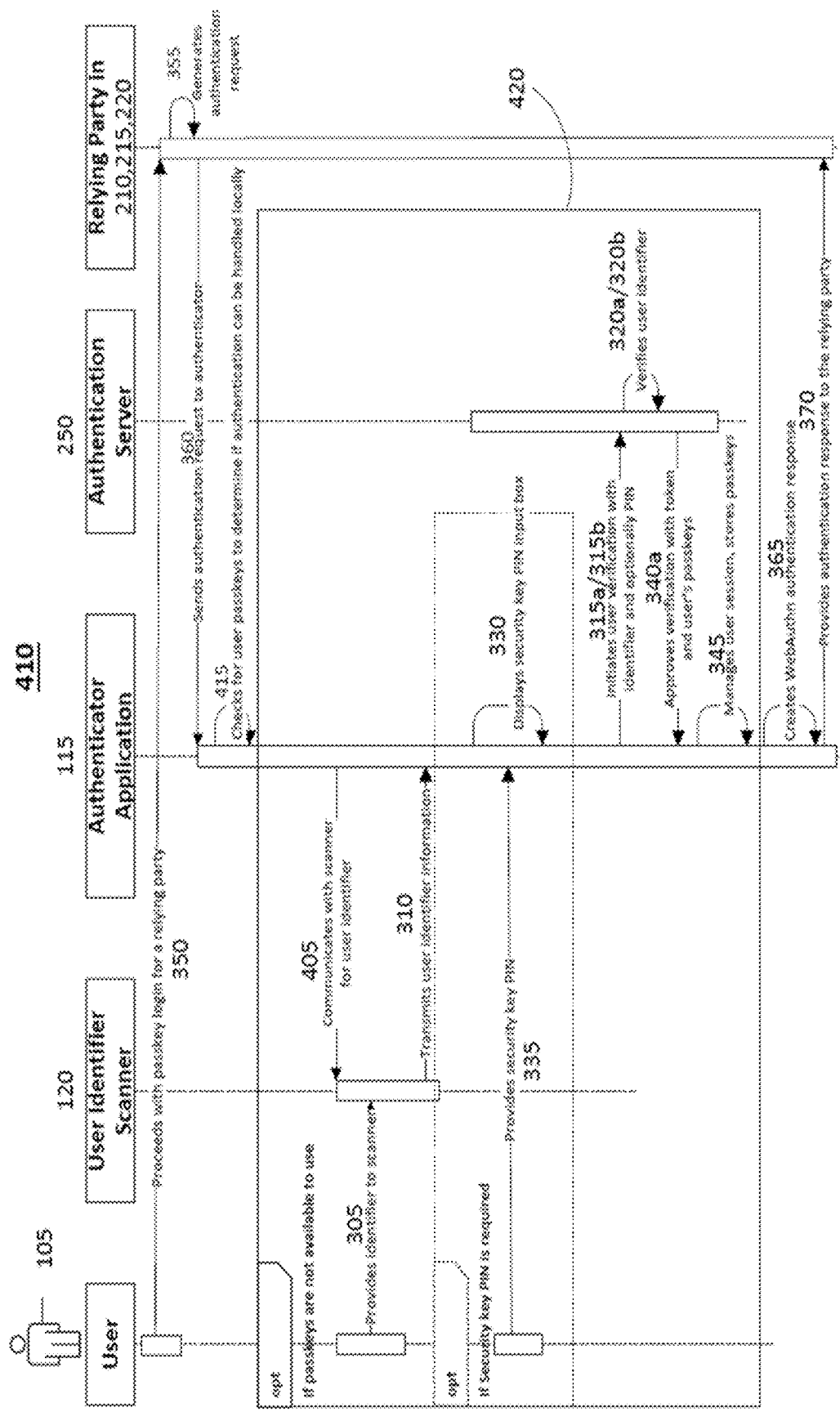
FIG. 4B shows an example authentication process diagram where an authenticator application fetches passkeys from an authentication server if they are not already available on the device, according to some embodiments described herein.

FIG. 4B shows an example of how the system manages passkey retrieval, local WebAuthn authentication, and session control, allowing secure authentication in multi-user, shared environments. FIG. 4B presents an exemplary authentication process 410 with a fragment 420 in which the authenticator application 115 is configured to retrieve passkeys 265 onto the computing device 110 to enable local authentication. In this configuration, the authenticator application 115 operates as a third-party passkey provider, facilitating WebAuthn-based authentication by leveraging passkey storage and user identification processes.

At step 350, user 105 initiates a passkey login to access a relying party, which could be a native service, web application, or browser-based application in components 210, 215, or 220. This action begins the authentication process, prompting the system to verify user's passkey 265 before granting access to the requested resource.

At step 355, the relying party within components 210, 215, or 220 generates a WebAuthn authentication request. This request is then directed to the authenticator application 115, which is responsible for handling the WebAuthn-based authentication process, either locally or by interfacing with the authentication server.

At step 360, the authenticator application 115 receives the WebAuthn authentication request from the relying party. This request can be received through the platform WebAuthn API 205, where the authenticator application acts as a third-party passkey provider via passkey provider interface 230, as illustrated in FIG. 2A, system 200. Alternatively, as depicted in FIG. 2B, the authenticator application may intercept Web Authentication API calls within the browser 215, functioning as an extension or plugin. This flexibility allows the system to manage WebAuthn requests across various configurations.

Following the receipt of the WebAuthn authentication request, the authenticator application 115, at step 415, checks for the presence of user passkeys 265 on the local device to determine if the authentication request can be processed locally. If the passkeys are not available for use (e.g., if they are invalid, expired, or missing), a fragment 420 may be triggered.

The fragment 420 initiates a process to verify the user 105 and fetch the passkeys 265 from the authentication server 250, making them available on the computing device 110 for authentication processing.

At step 405, the authenticator application 115 engages with the user identifier scanner 120 to retrieve the user identifier 125. This communication enables the application 115 to gather the necessary information for user identification and verification, which will be used in conjunction with the passkeys for authenticating the user 105.

At step 305, user 105 provides the user identifier 125 to the user identifier scanner 120. This identifier, which may take various forms such as an RFID/NFC card, fingerprint, or QR code, serves as a unique identifier that allows the system to recognize and verify the user. At step 310, the user identifier scanner 120 transmits the captured user identifier information 125 to the authenticator application 115, facilitating the continuation of the authentication process.

Based on the system configuration, the authenticator application 115 may prompt user 105 for an additional security key PIN at step 330. This optional step enhances security by requiring multi-factor authentication. At step 335, user 105 may enter the security key PIN if required by the system configuration, adding an additional layer of identity verification.

At step 315a/315b, the authenticator application 115 initiates the user verification flow, which includes the user identifier information 125, the optional PIN, and the WebAuthn authentication request received at step 360. This comprehensive data set is sent to the authentication server 250, which performs an in-depth verification of the user's identity.

At step 320a/320b, the authentication server 250 verifies user 105 using the user identifier information 125, applying specific matching operations based on the identifier type (e.g., RFID/NFC, face, fingerprint, QR code/barcode) and the configuration of the system. The verification process may require additional factors, such as the provided security PIN, depending on the security settings, user identifier type, and the system's authentication policies.

At 340a, once the user verification is successfully completed, the authentication server 250 may issue a token to the authenticator application 115. Additionally, the server may send user passkeys 265 and other relevant user information, depending on the system configuration, enabling further secure interactions and communications.

At step 345, the authenticator application 115 is configured to manage the user session and store the passkeys, functioning as a third-party passkey provider. This setup allows the passkeys to be accessed through the passkey provider interface 230 and the platform WebAuthn API 205 by relying parties, including those represented by components 210, 215, and 220. This configuration supports efficient and secure access to passkeys for various applications within the system.

At step 365, the authenticator application 115 generates a WebAuthn authentication response based on the WebAuthn authentication request received at step 360. This locally generated response, enabled by the passkeys retrieved at step 340a, satisfies the relying party's authentication requirements, allowing the system to authenticate the user without additional server interactions.

Finally, at step 370, the authenticator application 115 transmits the WebAuthn authentication response to the relying party within components 210, 215, or 220. This response completes the authentication process, enabling the relying party to confirm user 105's identity and grant access to the requested service or resource.

As can be understood, the examples described above and illustrated are intended to be exemplary only.

What is claimed is:

1. A system for secure user authentication with passkeys on shared computing devices, the system comprising:
a computing device with an authenticator application residing thereon configured to:
communicate with one or more user identifier scanners to obtain unique user-specific identifiers, wherein the application is configured to communicate with the scanners whether internal or external to the computing device;
communicate with an authentication server to verify one or more users' identity based on the user-specific identifiers obtained from the scanner;
operate as a third-party passkey provider integrated with a Web Authentication application programming interface (WebAuthn API) to provide passkey-based authentication;
function as a browser extension or plugin to intercept the WebAuthn API calls for web-based relying parties and provide passkey-based authentication;
transmit authentication requests and the user-specific identifiers securely to the authentication server for enabling centralized authentication management and verification;
a user identifier scanner configured to capture the user-specific identifiers, wherein the scanner is internal to the computing device or externally connected through different types of connections comprising one or more of Universal Serial Bus (USB), Bluetooth Low Energy (BLE), or Near-field communication (NFC), and wherein the scanner is capable of capturing various types of identifiers comprising one or more of Radio-frequency identification (RFID) data, NFC data, biometric data, and quick response (QR) codes to initiate the authentication process;
the authentication server accessible over a network, configured to:
host user-specific authenticators;
map received user-specific identifiers to stored authenticators and perform user verification based on the identifier type;
request an additional authentication factor, such as a security personal identification number (PIN), required based on the identifier type and configuration;
generate and transmit an authentication response, including user passkeys and an authentication token, upon successful user verification, for enabling the authenticator application to handle further WebAuthn authentication requests either locally or by forwarding them back to the authentication server for processing;
store the user passkeys securely using secure storage comprising a hardware security module (HSM) to protect sensitive user data;
wherein upon successful user verification:
the authenticator application receives the user passkeys and a session token, enabling the authenticator application to act as a platform authenticator on the computing device, making passkeys available for WebAuthn-based authentication across native applications, browsers, and services on the device;
the authenticator application temporarily stores the user passkeys for the duration of the session, with configurable options for single-use, time-based, or session-based expiration;
the authenticator application processes Web Authentication (WebAuthn) authentication requests locally or forwards them to the authentication server based on configuration, and transmits WebAuthn authentication responses to a relying party for granting the user access to the requested service or application;
wherein the system operates across multiple platforms allowing the authenticator application to perform secure, passkey-based authentication on various devices.

2. The system of claim 1, wherein the authenticator application is configured to communicate with one or more user identifier scanners, both internal and external to the computing device, through transport protocols including USB, BLE, and NFC, enabling it to obtain user-specific identifiers comprising one or more of RFID/NFC data, biometric data, and QR codes.

3. The system of claim 1, wherein the authenticator application communicates with the authentication server over a secure network connection to verify the user's identity, wherein the authentication server applies different matching operations based on the type of user identifier provided, and depending on the configuration, requires an additional authentication factor, such as a security PIN, for enhanced security.

4. The system of claim 1, wherein the authenticator application is configured to operate as a third-party passkey provider by integrating with the platform WebAuthn API through a passkey provider interface, thereby enabling native applications, browsers, and other relying parties on the computing device to securely access passkeys for WebAuthn-based authentication.

5. The system of claim 1, wherein the authenticator application functions as a browser extension or plugin within a browser environment, intercepting WebAuthn API calls initiated by a relying party web application, wherein the authenticator application manages WebAuthn requests independently of the native WebAuthn interface, allowing it to generate and return authentication responses directly to the relying party within the browser.

6. The system of claim 1, wherein the authenticator application transmits authentication requests and user-specific identifiers securely to the authentication server, allowing the server to centrally manage and verify authentication information.

7. The system of claim 1, wherein the user identifier scanner is configured to capture unique identifiers, including but not limited to RFID/NFC card data, fingerprints, facial recognition data, and QR codes, allowing it to gather user-specific identifiers across various configurations.

8. The system of claim 1, wherein the user identifier scanner may be internal to the computing device or an external device connected through USB, BLE, or NFC, providing flexibility in hardware configurations for obtaining user identifiers.

9. The system of claim 1, wherein the user identifier scanner communicates captured user identifier information to the authenticator application for initiating the authentication process and ensuring secure access control for user-specific authentication.

10. The system of claim 1, wherein the authentication server is configured to manage user-specific authenticators and securely store user passkeys, providing a centralized source for accessing user-specific authentication credentials.

11. The system of claim 1, wherein the authentication server verifies the users' identity by mapping received user-specific identifiers to stored authenticators and applying various matching algorithms based on the identifier type, ensuring accurate user verification.

12. The system of claim 1, wherein the authentication server is configured to request an additional authentication factor, such as a security PIN, based on the identifier type or system configuration, enhancing the security of the user verification process.

13. The system of claim 1, wherein the authentication server generates an authentication response upon successful user verification, including a session token and user passkeys, enabling the authenticator application to handle WebAuthn requests locally or forward them to the authentication server for further processing.

14. The system of claim 1, wherein the authentication server securely stores passkeys and other sensitive user information in a secure storage facility comprising a hardware security module (HSM), to protect against unauthorized access.

15. The system of claim 1, wherein, upon successful user verification, the authenticator application receives user passkeys and a session token, allowing it to act as a platform authenticator on the computing device and make passkeys accessible for WebAuthn-based authentication across native applications, browsers, and services.

16. The system of claim 1, wherein the authenticator application temporarily stores user passkeys for the duration of the user session, with options for single-use, time-based, or session-based expiration, ensuring secure access in shared environments.

17. The system of claim 1, wherein the authenticator application, based on configuration, processes WebAuthn authentication requests either locally on the device using the retrieved passkeys or by forwarding them to the authentication server for remote processing.

18. The system of claim 1, wherein the authenticator application transmits WebAuthn authentication responses to relying parties, enabling WebAuthn-based authentication for applications, browsers, and native services on the device.

19. The system of claim 1, wherein the authenticator application, by managing session tokens and passkeys, ensures that user-specific authentication data is securely accessible for the duration of a session and can be erased or reset upon session expiration.

20. The system of claim 1, wherein the authenticator application is configured to manage user sessions in shared device environments by automatically clearing or resetting user-specific passkeys and authentication data based on configurable conditions, such as session expiration, a specified time interval, or at the end of a work shift, thereby ensuring that the device is ready for the next user.

* * * * *